(No Model.)
C. LA DOW.
DISK HARROW.
No. 451,421. Patented Apr. 28, 1891.
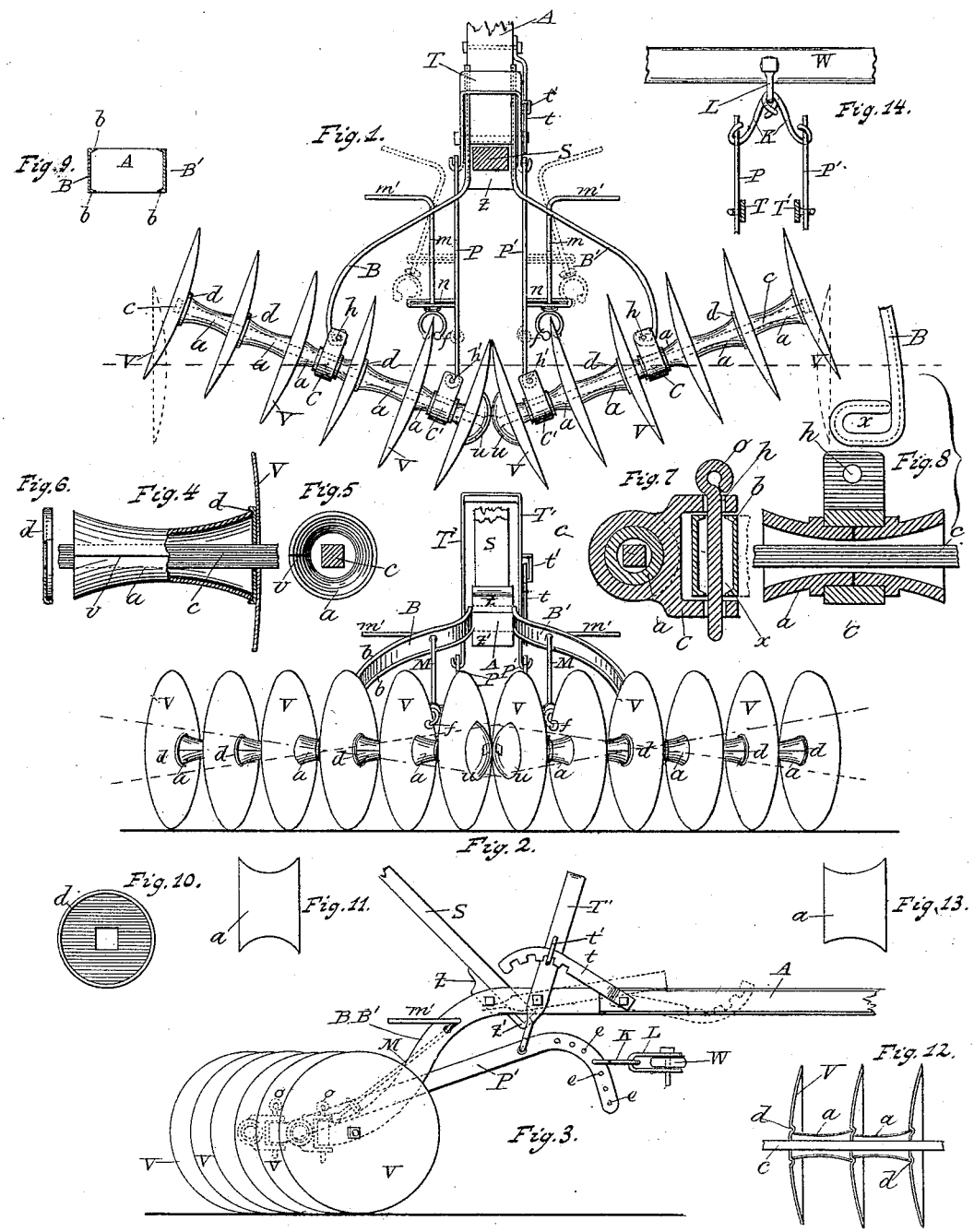

UNITED STATES PATENT OFFICE.

CHARLES LA DOW, OF ALBANY, NEW YORK.

DISK HARROW.

SPECIFICATION forming part of Letters Patent No. 451,421, dated April 28, 1891.

Application filed March 15, 1887. Serial No. 231,060. (No model.)

*To all whom it may concern:*

Be it known that I, CHARLES LA DOW, a citizen of the United States, residing at Albany, in the county of Albany, State of New York, have invented certain new and useful Improvements in Disk Harrows, of which the following is a specification.

My invention relates to disk harrows, and is designed to simplify their construction and to render them more perfect and convenient in operation, and also to reduce their expense.

In the drawings, Figure 1 represents a top view of my invention, showing by full lines the position occupied by the gangs when set for operation, and by dotted lines showing the position to which the gangs may be adjusted for transportation from one field to another. Fig. 2 is a rear view showing by dotted lines the vertical vibration which the ends of the gangs may have on their draft-connections. Fig. 3 is a side view showing the method of attaching the folding lever and its folding ratchet to the pole, also showing the method of hinging the inner draft-connections to the lever, and also showing the method of attaching the draft of the team to the forward ends of the draft-connections. Fig. 4 represents a sectional view of one of the disks V, the axle $c$, also the spool $a$ stamped out of sheet metal, also showing at $v$ the split between the edges where said spool is divided, also showing the collar or box $d$, which embraces the ends of the spool and prevents the split in said spool from opening or spreading apart. Fig. 5 represents an end view of the spool $a$, the axle $c$, and the split $v$ in the spool. Fig. 6 represents an edge view of the box $d$, which embraces the end of the spool, having one part of its flange cut away. Fig. 7 represents an end sectional view of the axle $c$, the spool $a$, the boxing C, which surrounds the spool, also showing the rear end of one of the hounds B entering the bifurcated jaw of the boxing C, also the pin $o$, which passes through the hole $h$, and thus flexibly maintains the hound within the boxing. Fig. 8 represents a sectional view of one of the spools $a$, to which the draft is applied. These spools are made of cast-iron and have flanges to prevent their boxes C and C' from moving lengthwise on the spools. This view also represents a section of the box C, and it also shows the rear end of one of the hounds B and the slot $x$ adapted to receive the pin $o$. Fig. 9 represents a rear view of the rear end of the pole A and a sectional view of the hounds B and B', which are made of angle-iron, the angles or beads on said irons fitting the chamfers on the pole. Fig. 10 represents an end view of the boxing $d$, adapted to embrace the end of the spool $a$. Fig. 11 represents the form in which the spool is stamped out from sheet metal before it is bent in the form shown in Fig. 4. When stamped out, as shown in Fig. 11, the spool will be of a uniform size at each end and the boxing $d$ will fit either end of said spool, providing the center of the disk V is flattened to an extent equaling the diameter of the boxing; but if the disk V is concave from its edge to its center then the boxings $d$ must be formed to fit both the concave and convex sides of the disk. Fig. 12 represents a sectional view of a portion of a gang in which the disks V have a circle indented into them around their axles, into which circle the ends of the spool may fit, and thus dispense with the boxing $d$ heretofore described. When made in this form, the spool $a$ should be stamped out, as shown in Fig. 13, having one end wider than the other, which will adapt the end of the spool thus made largest to fit into the ring or corrugation on the convex side of the disk while the smaller end of the spool will fit inside of the ring on the concave side of the disk. This ring performs the same functions as the flange heretofore described in the boxing $d$—namely, preventing the split in the spool from spreading apart—and also likewise forms a bearing for the ends of the spool, (of which bearing the hole in the disk is the center,) and which will consequently maintain the ends of the spool at a uniform distance from the axle on all sides thereof. Fig. 14 represents a top view of the whiffletree W, the inner draft-connections P and P', also showing sections of the bifurcated lever T T', also showing the links K, which couple the draft-connections P and P' independently to the draft-clevis of the whiffletree W in such manner that the front ends of the draft-connections may vibrate up and down independently of each other when the inner ends of the gangs work up and down independently of each other.

In disk harrows as heretofore constructed it has in many cases been customary to provide scrapers for the disks, and in all such cases as known to me various mechanisms, such as knives, wheels, cutters, and the like, have been made to shear or scrape the earth from the revolving disks, and such devices have been more or less expensive to apply, and more or less uncertain in their operation and efficiency. In this invention I cause the earth over which the implement is drawn to scrape the disks, and to accomplish such result I apply a brake to retard (to a greater or less extent) the revolution of the disks. This brake may be of any desired form, and may be applied to the disks themselves or to their axles, or to any other revolving part of the machine, and may be so applied as to entirely check the revolution of a gang or only so as to make it revolve more slowly than it naturally would were no brake applied. When the disks are angled and are drawn forward and held by a brake from revolving, (or thereby caused to revolve more slowly than they would were no brake applied,) the earth over which they are drawn is caused to slide across their angled concave faces in the same manner as the earth slides over the stationary mold-board of a plow, and thus the disks are effectually cleaned from soil (that might otherwise adhere to them) without the use of any scraper appliance whatever.

In the drawings, as shown in Figs. 1, 2, and 3, I have shown brakes (indicated by $f f$) arranged to nip against opposite sides of their respective disks and operated by torsion-rods $m$ $m$, having the angles $m'$ $m'$, adapted to receive pressure from the driver's feet, so as to rock said rods and apply a brake to each gang. The rear ends of these torsion-rods are shown as each supported on the inner draw-bars of the gangs by means of staples $n$ $n$, which staples allow the rear ends of said brakes to follow all the movements of the adjustable and vibratory disk gangs. The front ends of these torsion-rods are each supported by passing through a hole in the hounds B B'. When the gangs are angularly adjusted, these brakes will follow the movement of the gangs and occupy the position indicated by dotted lines in Fig. 1, maintaining a uniform distance from the gang during all its vibrations and adjustments.

In the drawings, A is the draft-pole, and B B' are hounds bolted rigidly to the sides of the pole and preferably made of angle-iron. The beads $b$ on said hounds embrace the chamfers of the pole, as shown in Fig. 1, so as to admit of the hounds being clamped and rigidly held to the pole by means of one bolt only, thus enabling a very neat, cheap, and convenient draft-frame structure to be obtained. The rear ends of the hounds are bent downward, so as to raise the rear end of the pole, its lever, and also the draft attachments above obstructions.

The gangs are composed of disks V, mounted on axles $c$ and having spacing-spools $a$ between the disks, the inner ends of the axles being provided with buffer-heads $u$ $u$ (for counteracting the end-thrusts of the gangs) and the outer ends of the axles being each provided with a clamping-nut for uniting the buffer, spools, and disks in each gang rigidly together.

The hounds are preferably connected midway between the ends of the gangs by boxes C C, a hinge-pin $o$ passing loosely through holes $h$ in said boxes and through the slotted rear ends $x$ $x$ of the hounds B B'. These slots $x$ $x$ permit the gangs to move endwise relatively to the hounds to allow the buffers to abut against each other at any angle to which the gangs may be set. The rear ends of the inner draw-bars are connected with the gangs by boxes C' C' in the same manner as the hounds are connected to their boxes, only the rear end of the inner draw-bars are not necessarily slotted. By withdrawing the coupling-pins $o$ from the hounds and draw-bars both gangs are detached from the draft-frame. The draw-bars P P' are each pivoted at a point between their ends to hooks formed on the lower ends of the bifurcated lever T T'. This lever is pivoted on the draft-pole in such manner that when the machine is to be packed for transportation the lever will fold close to the pole. The lever is governed in its movement by the ratchet-bar $t$ entering the staple $t'$, which is affixed to one side of the lever. This ratchet-bar may be detached from its staple, and then it may also be folded close to the side of the pole. The forward ends of the draw-bars P P' are bent downward, as shown in Fig. 3, and these bent ends are provided with a series of holes $e$ $e$ $e$ for the reception of the adjustable draft-links or compensating device K. These draft-links operate independently of each other at their rear ends and their front ends engage with the clevis L of the whiffletree W.

When vibratory gangs having their convex ends adjacent are set at a sharp angle relatively to each other, their inner ends have a tendency to rise unduly, so that the inner disks normally do not cut as deep as the outer disks, and to overcome this existing well-known defect many devices in other harrows have been used, chiefly such as should prevent the inner ends of the gangs from rising above a certain fixed point; but such devices are more or less defective, for the reason that the inner ends of the gangs could not vibrate above a horizontal plane in an upward direction, and to overcome such defect I attach the draw-bars P P' at points between their ends to the fulcrum-hooks T T', Fig. 14, of the lever T, and I attach the draft of the team at any desired vertical point to the forward ends of said draw-bars in such manner that the draft of the animals may counteract any tendency of the inner ends of the gangs to rise unduly, the adjustable draft-links permitting the draft leverage of the team to be varied up or down, so that the pressure upon the inner ends of the gangs may be regulated according to the angle occupied by the gangs or according to the degree of end-thrust sustained by them from any cause, and in this manner I cause the gangs to cut uniformly deep the entire length of each gang and also allow their inner ends to vibrate freely both up and down.

It will be observed that the draft-links or compensating device K may be readily detached from and inserted into any of the holes in the front ends of the draw-bar. It will also be observed that said links form a flexible coupling between said draw-bars and the whiffletree, allowing one draw-bar to vibrate up and down independently of its fellow. The team, being attached to the lever, their draft assists in setting the gangs at angles, thus relieving the operator greatly.

The draft-spools which support the boxes C and C' are made of cast-iron in the usual manner; but for such spools where the draft is not applied I prefer to use sheet metal stamped out, as shown in Figs. 11 and 13, and have the same formed into spools, as shown in Fig. 4, enabling me to dispense with considerable weight and expense. The spools so formed have a split $v$ extending from one end to the other on one side of each spool, and when pressure is applied by means of the clamp-nut to the ends of said spools said split would open and destroy the efficiency of the spool unless means were used to prevent the split sides of the spools from opening. This I preferably accomplish by indenting a circular depression into the convex side of the disks, as shown in Fig. 12, and permitting one end of one spool to enter said depression on the convex side of said disk and forming the abutting end of its fellow spool somewhat smaller, so it will fit inside the projecting ring on the concave side of the disk, and to accomplish this result the spools are stamped out, as shown in Fig. 13, with one end wider than the other; but this result may be accomplished by stamping out the spools, as shown in Fig. 11, and providing a shallow cup for their ends, as shown at $d$ in Fig. 10, and also shown at $d$ in Fig. 4. Either of these devices just described forms a bearing for the ends of the spool, which holds it at a uniform distance from all sides of the axle, and the disk and its central hole, or the central hole in the cup $b$ (whichever style is used) serves to always bring the ends of the spools to a uniform distance from their axle. The ends of the spools may be made largest, so as to brace the disks, and their central portion made smaller than their ends, so as to form a bearing on the axle near the middle of the spool. It will be observed that as the hounds are made of angle-iron the ribs on said iron form a very rigid connection with the pole, and also form a very light and also stiff draft-frame for the gangs. The seat-bar S is mounted at the rear end of the pole between the inner sides of the hounds. A casting Z is fastened to said hounds in rear of the seat-bar and serves to support the bar from giving way beneath the driver. The lower end of said casting Z is provided with an angle $z'$, which prevents the seat from sliding endwise and downward. This construction holds the seat-bar in place without bolts fastened to it, so that when the machine is to be taken apart the seat-bar may be withdrawn from the socket formed by the pole, the hounds, and the casting Z.

Any form of brake may be applied in any desired manner to the revolving gangs and to either gang separately, or to both gangs simultaneously, and so as to only retard their revolution or stop it altogether; and I do not limit myself to any particular form of brake, nor to any specified manner of applying it for the purpose described. Neither do I limit myself to the other means described for constructing or operating the various inventions hereinbefore described, as they may be constructed and operated in other ways (to perform the results set forth) without departing from the spirit of my invention.

I claim as my invention—

1. In a harrow, a draft-frame and a revolving cutter attached thereto, in combination with retarding devices for checking the revolution of said cutter.

2. In a harrow, a draft-frame and a revolving cutter attached thereto and set at an angle to the draft, in combination with retarding devices adapted to check the revolution of the cutter for the purpose of causing the earth over which it is drawn to clear said cutter from earth accumulated thereon during previous revolutions.

3. In a harrow, a draft-frame and a gang of revolving cutters hinged to the draft-frame, in combination with a brake adapted to check the revolution of the gang and also adapted to move in concert with the movement of said gang.

4. In a harrow, a disk gang and an axle upon which the disks are mounted, in combination with spacing-spools formed of sheet metal, bent to bring their longitudinal edges together, and secured substantially as set forth.

5. In a harrow, a disk-gang and an axle upon which the disks are mounted, in combination with spacing-spools, each stamped out of a single piece of sheet metal, bent to form a spool, and secured substantially as set forth.

6. In a harrow, the combination of a disk gang and an axle upon which the disks are mounted, and spacing-spools bent up from sheet metal, and devices for holding the longitudinal edges of the sheet-metal spools together.

7. In a harrow, the combination of a disk gang, an axle upon which the disks are mounted, spacing-spools formed of metal stamped out of sheets and bent to bring the longitudinal edges of the blanks together, and devices for holding the spools concentric with the axis of the disk.

8. In a harrow, a disk gang, an axle upon which the disks are mounted, and spacing-spools for the disks, formed of sheet metal, in combination with spool-holding devices adapted to prevent the spools from splitting open.

9. The combination of opposing gangs of vibratory revolving cutters, a draft-frame to which they are connected, draft-connections attached to the inner ends of the gangs and pivoted to a fulcrum located in advance of their connections to the gangs, and a whiffletree vertically adjustable on the front ends of the draft-rods.

10. The combination of opposing gangs of vibratory revolving cutters, a draft-frame to which they are connected, draft-rods connected to the inner ends of the gangs and having their front ends curved, a whiffletree vertically adjustable on said curved ends, and a lever pivoted to the draft-frame and forming a fulcrum for the draft-rods between their ends.

11. The combination of opposing gangs of vibratory revolving cutters, a draft-frame, a whiffletree, draft-rods connected to the inner ends of the gangs and fulcrumed on the draft-frame between the ends of the draft-rods, and a compensating device connecting the rods and the whiffletree, whereby the draft of the team is applied equally to the front end of each independently-acting adjusting-rod.

12. In a harrow, a draft-pole and a lever mounted thereon and adapted to fold upon the pole, in combination with a ratchet adapted to engage with said lever for holding it in its adjusted position relatively to the pole, and also adapted to be disengaged from the lever and also folded upon the pole.

13. In a harrow, a draft-frame composed of the pole A and the hounds B and B', said hounds being made of ribbed iron, the ribs of which embrace the pole.

14. In a harrow, two gangs of cutters and a draft-pole, in combination with hounds connected to the pole in advance of the gangs, which extend outwardly from the pole and downwardly to the axles of the gangs, said hounds forming the sole support for the rear end of the draft-pole, and being loosely connected with the gangs and adapted to raise it above the gang-axles.

15. In a harrow, two gangs of cutters having abutting buffers between the gangs, and a draft-pole, in combination with hounds connecting said pole and gangs (without an intervening cross-bar) and adapted to permit end motion of the gangs to enable their buffers to abut when set at various angles.

16. In a harrow, rotary cutters, their gang-shaft, the divided spools $a$, bifurcated boxes formed in one piece enveloping the divided spool and having jaws projecting forward in a horizontal line with their axle, and draft-connections having punctured rear ends which enter said bifurcated jaws, in combination with pins $o$ $o$ for coupling said parts in such manner as to permit their rapid detachment.

17. The combination, substantially as set forth, of the boxes having forwardly-projecting jaws, the draft-connections having elongated apertures $x$, and the coupling-pins $o$.

18. In a harrow, a draft-frame and two gangs of cutters hinged to the draft-frame, so as to vibrate up and down at their inner ends independently of each other, in combination with means for connecting the draft-whiffletree to the inner ends of the gangs in such manner that the draft of the team shall depress the inner ends of both gangs simultaneously and yet permit said inner ends to vibrate vertically independently of each other.

In testimony whereof I have hereunto subscribed my name.

CHARLES LA DOW.

Witnesses:
EDWARD C. DAVIDSON,
BALTUS DE LONG.